(12) United States Patent
Faanes et al.

(10) Patent No.: US 7,519,771 B1
(45) Date of Patent: Apr. 14, 2009

(54) SYSTEM AND METHOD FOR PROCESSING MEMORY INSTRUCTIONS USING A FORCED ORDER QUEUE

(75) Inventors: Gregory J. Faanes, Eau Claire, WI (US); Eric P. Lundberg, Eau Claire, WI (US); Steven L. Scott, Eau Claire, WI (US); Robert J. Baird, Merritt Island, FL (US)

(73) Assignee: Cray Inc., Seattle, WA (US)

( * ) Notice: Subject to any disclaimer, the term of this patent is extended or adjusted under 35 U.S.C. 154(b) by 215 days.

(21) Appl. No.: 10/643,577

(22) Filed: Aug. 18, 2003

(51) Int. Cl.
*G06F 12/00* (2006.01)
(52) U.S. Cl. ................................ 711/118; 711/154
(58) Field of Classification Search .............. 711/118, 711/154
See application file for complete search history.

(56) References Cited

U.S. PATENT DOCUMENTS

| | | | |
|---|---|---|---|
| RE28,577 E | 10/1975 | Schmidt | |
| 4,412,303 A | 10/1983 | Barnes et al. | |
| 4,414,624 A | 11/1983 | Summer, Jr. et al. | |
| 4,541,046 A | 9/1985 | Nagashima et al. | |
| 4,771,391 A | 9/1988 | Blasbalg | |
| 4,868,818 A | 9/1989 | Madan et al. | |
| 4,888,679 A | 12/1989 | Fossum et al. | |
| 4,933,933 A | 6/1990 | Dally et al. | |
| 4,989,131 A | 1/1991 | Stone | |
| 5,008,882 A | 4/1991 | Peterson et al. | |
| 5,012,409 A | 4/1991 | Fletcher et al. | |
| 5,031,211 A | 7/1991 | Nagai et al. | |
| 5,036,459 A | 7/1991 | Den Haan et al. | |
| 5,068,851 A | 11/1991 | Bruckert et al. | |
| 5,105,424 A | 4/1992 | Flaig et al. | |
| 5,157,692 A | 10/1992 | Horie et al. | |
| 5,161,156 A | 11/1992 | Baum et al. | |

(Continued)

FOREIGN PATENT DOCUMENTS

EP 0353819 A2 2/1990

(Continued)

OTHER PUBLICATIONS

IEEE 100: The Authoritative Dictionary of IEEE Standards Terms, Standards Information Network, 2000, pp. 1003.*

(Continued)

*Primary Examiner*—Shane M Thomas
(74) *Attorney, Agent, or Firm*—Schwegman, Lundberg & Woessner, P.A.

(57) ABSTRACT

A novel system and method for processing memory instructions. One embodiment of the invention provides a method for processing a memory instruction. In this embodiment, the method includes obtaining a memory request; storing the memory request in an Initial Request Queue (IRQ); and processing the memory request from the IRQ by a cache controller, wherein processing includes: identifying a type of the memory request, and processing the memory request in both a local cache and an Force Order Queue (FOQ), wherein processing includes determining if a portion of an address associated with the memory request matches one or more partial addresses in the FOQ and, if the memory request misses in the cache and the address does not match one or more partial addresses in the FOQ, adding the memory request to the FOQ and allocating a cache line in the local cache corresponding to the local cache miss.

12 Claims, 8 Drawing Sheets

U.S. PATENT DOCUMENTS

| | | |
|---|---|---|
| 5,170,482 A | 12/1992 | Shu et al. |
| 5,175,733 A | 12/1992 | Nugent |
| 5,197,130 A | 3/1993 | Chen et al. |
| 5,218,601 A | 6/1993 | Chujo et al. |
| 5,218,676 A | 6/1993 | Ben-ayed et al. |
| 5,239,545 A | 8/1993 | Buchholz |
| 5,247,635 A | 9/1993 | Kamiya |
| 5,247,639 A * | 9/1993 | Yamahata .................. 711/138 |
| 5,247,691 A | 9/1993 | Sakai |
| 5,276,899 A | 1/1994 | Neches |
| 5,280,474 A | 1/1994 | Nickolls et al. |
| 5,313,628 A | 5/1994 | Mendelsohn et al. |
| 5,313,645 A | 5/1994 | Rolfe |
| 5,331,631 A | 7/1994 | Teraslinna |
| 5,333,279 A | 7/1994 | Dunning |
| 5,341,482 A | 8/1994 | Cutler et al. |
| 5,341,504 A | 8/1994 | Mori et al. |
| 5,347,450 A | 9/1994 | Nugent |
| 5,353,283 A | 10/1994 | Tsuchiya |
| 5,365,228 A | 11/1994 | Childs et al. |
| 5,375,223 A | 12/1994 | Meyers et al. |
| 5,418,916 A | 5/1995 | Hall et al. |
| 5,430,850 A | 7/1995 | Papadopoulos et al. |
| 5,430,884 A | 7/1995 | Beard et al. |
| 5,434,995 A | 7/1995 | Oberlin et al. |
| 5,440,547 A | 8/1995 | Easki et al. |
| 5,446,915 A | 8/1995 | Pierce |
| 5,517,497 A | 5/1996 | LeBoudec et al. |
| 5,530,933 A | 6/1996 | Frink et al. |
| 5,546,549 A | 8/1996 | Barrett et al. |
| 5,548,639 A | 8/1996 | Ogura et al. |
| 5,550,589 A | 8/1996 | Shiojiri et al. |
| 5,555,542 A | 9/1996 | Ogura et al. |
| 5,560,029 A | 9/1996 | Papadopoulos et al. |
| 5,606,696 A | 2/1997 | Ackerman et al. |
| 5,640,524 A | 6/1997 | Beard et al. |
| 5,649,141 A | 7/1997 | Yamazaki |
| 5,684,977 A | 11/1997 | Van Loo et al. |
| 5,717,895 A | 2/1998 | Leedom et al. |
| 5,721,921 A | 2/1998 | Kessler et al. |
| 5,765,009 A | 6/1998 | Ishizaka |
| 5,781,775 A | 7/1998 | Ueno |
| 5,787,494 A | 7/1998 | Delano et al. |
| 5,796,980 A | 8/1998 | Bowles |
| 5,812,844 A | 9/1998 | Jones et al. |
| 5,835,951 A | 11/1998 | McMahan |
| 5,860,146 A | 1/1999 | Vishin et al. |
| 5,897,664 A | 4/1999 | Nesheim et al. |
| 5,978,830 A | 11/1999 | Nakaya et al. |
| 5,987,571 A | 11/1999 | Shibata et al. |
| 5,995,752 A | 11/1999 | Chao et al. |
| 6,003,123 A | 12/1999 | Carter et al. |
| 6,014,728 A | 1/2000 | Baror |
| 6,088,701 A | 7/2000 | Whaley et al. |
| 6,101,590 A | 8/2000 | Hansen |
| 6,105,113 A | 8/2000 | Schimmel |
| 6,161,208 A | 12/2000 | Dutton et al. |
| 6,247,169 B1 | 6/2001 | DeLong |
| 6,269,390 B1 | 7/2001 | Boland |
| 6,269,391 B1 | 7/2001 | Gillespie |
| 6,308,250 B1 | 10/2001 | Klausler |
| 6,308,316 B1 | 10/2001 | Hashimoto et al. |
| 6,317,819 B1 | 11/2001 | Morton |
| 6,336,168 B1 * | 1/2002 | Frederick et al. ............ 711/141 |
| 6,339,813 B1 | 1/2002 | Smith et al. |
| 6,356,983 B1 | 3/2002 | Parks |
| 6,385,715 B1 * | 5/2002 | Merchant et al. ............ 712/219 |
| 6,389,449 B1 | 5/2002 | Nemirovsky et al. |
| 6,393,536 B1 * | 5/2002 | Hughes et al. ............... 711/159 |
| 6,430,649 B1 | 8/2002 | Chaudhry et al. |
| 6,490,671 B1 | 12/2002 | Frank et al. |
| 6,496,902 B1 | 12/2002 | Faanes et al. |
| 6,496,925 B1 | 12/2002 | Rodgers et al. |
| 6,519,685 B1 | 2/2003 | Chang |
| 6,591,345 B1 | 7/2003 | Seznec |
| 6,665,774 B2 | 12/2003 | Faanes et al. |
| 6,684,305 B1 | 1/2004 | Deneau |
| 6,782,468 B1 | 8/2004 | Nakazato |
| 6,816,960 B2 | 11/2004 | Koyanagi |
| 6,879,948 B1 | 4/2005 | Chalfin et al. |
| 6,910,213 B1 | 6/2005 | Hirono et al. |
| 6,922,766 B2 | 7/2005 | Scott |
| 6,925,547 B2 | 8/2005 | Scott et al. |
| 6,952,827 B1 | 10/2005 | Alverson et al. |
| 6,976,155 B2 | 12/2005 | Drysdale et al. |
| 7,028,143 B2 | 4/2006 | Barlow et al. |
| 7,089,557 B2 | 8/2006 | Lee |
| 7,103,631 B1 | 9/2006 | van der Veen |
| 7,111,296 B2 | 9/2006 | Wolrich et al. |
| 7,137,117 B2 | 11/2006 | Ginsberg |
| 7,143,412 B2 | 11/2006 | Koenen |
| 7,162,713 B2 | 1/2007 | Pennello |
| 7,191,444 B2 | 3/2007 | Alverson et al. |
| 7,334,110 B1 | 2/2008 | Faanes et al. |
| 7,421,565 B1 | 9/2008 | Kohn |
| 7,437,521 B1 | 10/2008 | Scott et al. |
| 2002/0078122 A1 | 6/2002 | Joy et al. |
| 2002/0091747 A1 | 7/2002 | Rehg et al. |
| 2002/0116600 A1 | 8/2002 | Smith et al. |
| 2002/0169938 A1 | 11/2002 | Scott et al. |
| 2002/0172199 A1 | 11/2002 | Scott et al. |
| 2003/0005380 A1 | 1/2003 | Nguyen et al. |
| 2003/0018875 A1 * | 1/2003 | Henry et al. ................. 711/203 |
| 2003/0097531 A1 | 5/2003 | Arimilli et al. |
| 2003/0167383 A1 | 9/2003 | Gupta et al. |
| 2003/0196035 A1 * | 10/2003 | Akkary ....................... 711/108 |
| 2004/0044872 A1 | 3/2004 | Scott |
| 2004/0064816 A1 | 4/2004 | Alverson et al. |
| 2004/0162949 A1 | 8/2004 | Scott et al. |
| 2005/0044128 A1 | 2/2005 | Scott et al. |
| 2005/0044339 A1 | 2/2005 | Sheets |
| 2005/0044340 A1 | 2/2005 | Sheets et al. |
| 2005/0125801 A1 | 6/2005 | King |
| 2007/0283127 A1 | 12/2007 | Kohn et al. |

FOREIGN PATENT DOCUMENTS

| | | |
|---|---|---|
| EP | 0473452 A2 | 3/1992 |
| EP | 0475282 A2 | 3/1992 |
| EP | 0501524 A2 | 9/1992 |
| EP | 0570729 A2 | 11/1993 |
| WO | WO-8701750 A1 | 3/1987 |
| WO | WO-8808652 A1 | 11/1988 |
| WO | WO-9516236 | 6/1995 |
| WO | WO-9610283 A1 | 4/1996 |
| WO | WO-9632681 A1 | 10/1996 |

OTHER PUBLICATIONS

Hennessy et al., "Computer Organization and Design: The Hardware/Software Interface," Morgan Kaufmann Publishers, Inc., 1998, pp. 593.*

Hennessy et al., "Comptuer Organization and Design The Hardware/Software Interface," Morgan Kaufmann Publishers, Inc., 1998, pp. 606.*

Collins et al., "Hardware Identification of Cache Conflict Misses," IEEE, 32nd Annual International Symposium on Microarchitecture, Nov. 18, 1999, pp. 126-135.*

Abts, D , "So Many States, So Little Time: Verifying Memory Coherence in the Cray X1", *Parallel and Distributed Processing Symposium*, (Apr. 22, 2003), 11-20.

Carlile, Bradley R., "Algorithms and Design: The CRAY APP Shared-Memory System", *COMPCON Spring '93. Digest of Papers.*, (Feb. 22, 1993), 312-320.

Chen, Y., et al., "UTLB: A Mechanism for Address Translation on Network Interfaces", *Processings of the Eighth International Conference on Architectural Support for Programming Languages and Operating Systems (ASPLOS)*, (1998), 193-204.

Gharachorloo, Kourosh , "Two Techniques to Enhance the Performance of Memory Consistency Models", *Proceedings of the International Conference on Parallel Processing*, (1991), 1-10.

Gupta, Rajiv, et al., "High Speed Synchronization of Processors Using Fuzzy Barriers", *International Journal of Parallel Programming 19(1)*, (Feb. 1990), 53-73.

Ishihata, Hiroaki, et al., "Architecture of Highly Parallel AP1000 Computer", *Systems and Computers in Japan*, 24(7), (1993), 69-76.

O'Keefe, Matthew T., et al., "Static Barrier MIMD: Architecture and Performance Analysis", *Journal of Parallel and Distributed Computing*, 25(2), (Mar. 25, 1995), 126-132.

Patterson, David A., et al., *Computer Architecture: A Quantitative Approach*, 2nd Edition, Morgan Kaufmann Publishers, Inc., San Francisco, CA,(1996),39-41.

Patterson, David A., et al., *Computer Architecture: A Quantitative Approach*, 2nd Edition, Morgan Kaufmann Publishers, Inc., San Francisco, CA,(1996),179-187, 373-384.

Patterson, David A., et al., *Computer Architecture: A Quantitative Approach*, 2nd Edition, Morgan Kaufmann Publishers, Inc., San Francisco, CA,(1996),699-708.

Patterson, D. A., et al., *Computer Architecture A Quantitative Approach, 2nd Edition*, Morgan Kaufmann Publishers, Inc., San Francisco, CA,(1996),255-260 & 308-317.

Patterson, D. A., et al., *Computer Architecture: A Quantitative Approach*, 2nd Edition, Morgan Kaufmann Publishers, San Francisco, CA,(1996),241-243.

Patterson, D. , et al., *Computer Architecture: A Quantitative Approach*, Second Edition, Morgan Kaufmann Publishers Inc. ,(1996),251-256.

Wood, D. A., et al., "An In-Cache Address Translation Mechanism", *Proceedings of the 13th Annual International Symposium on Computer Architecture*, (1986),358-365.

U.S. Appl. No. 10/235,898 Non Final Office Action mailed Jul. 7, 2004, 12 pgs.

U.S. Appl. No. 10/235,898 Notice of Allowance mailed Mar. 15, 2005, 4 pgs.

U.S. Appl. No. 10/235,898 Response filed Jan. 6, 2005 to Non Final Office Action mailed Jul. 7, 2004, 16 pgs.

U.S. Appl. No. 10/643,574, Non-Final Office Action Mailed Aug. 7, 2007, 31 pgs.

U.S. Appl. No. 10/643,574, Advisory Action mailed May 21, 2007, 3 pgs.

U.S. Appl. No. 10/643,574, Final Office Action mailed Mar. 5, 2007, 31 pgs.

U.S. Appl. No. 10/643,574, Non-Final Office Action mailed Jan. 30, 2006, 33 pgs.

U.S. Appl. No. 10/643,574, Non-Final Office Action mailed Jul. 28, 2006, 30 pgs.

U.S. Appl. No. 10/643,574, Notice of Allowance mailed Dec. 5, 2007, NOAR,5 pgs.

U.S. Appl. No. 10/643,574, RCE and Response Under 37 C.F.R. 1.116 filed Jul. 12, 2007 to Final Office Action mailed Mar. 5, 2007, 19 pgs.

U.S. Appl. No. 10/643,574, Response filed Nov. 28, 2006 to Non-Final Office Action mailed Jul. 28, 2006, 15 pgs.

U.S. Appl. No. 10/643,574, Response filed Nov. 7, 2007 to Non-final Office Action mailed Aug. 7, 2007, 15 pgs.

U.S. Appl. No. 10/643,574, Response filed May 1, 2006 to Non-Final Office Action mailed Jan. 30, 2006, 29 pgs.

U.S. Appl. No. 10/643,574, Response filed May 4, 2007 to Final Office Action mailed Mar. 5, 2007, 15 pgs.

U.S. Appl. No. 10/643,585, Advisory Action mailed Apr. 2, 2007, 3 pgs.

U.S. Appl. No. 10/643,585, Advisory Action mailed Aug. 14, 2006, 3 pgs.

U.S. Appl. No. 10/643,585, Amendment and Response filed Dec. 4, 2006 to Office Action mailed Oct. 23, 2006, 17 pgs.

U.S. Appl. No. 10/643,585, Amendment and Response filed Mar. 22, 2007 to Final Office Action mailed Jan. 25, 2007, 23 pgs.

U.S. Appl. No. 10/643,585, Amendment and Response filed Mar. 27, 2006 to Non-Final Office Action mailed Sep. 26, 2005, 7 pgs.

U.S. Appl. No. 10/643,585, Amendment and Response filed Aug. 3, 2006 to Final Office Action mailed Apr. 14, 2006, 9 pgs.

U.S. Appl. No. 10/643,585, Final Office Action mailed Jan. 25, 2007, 17 pgs.

U.S. Appl. No. 10/643,585, Final Office Action mailed Apr. 14, 2006, 13 pgs.

U.S. Appl. No. 10/643,585, Non-Final Office Action mailed Oct. 23, 2006, 12 pgs.

U.S. Appl. No. 10/643,585, Non-Final Office Action mailed Sep. 26, 2005, 9 pgs.

U.S. Appl. No. 10/643,585, Notice of Allowance mailed Dec. 11, 2007, NOAR,6 pgs.

U.S. Appl. No. 10/643,585, Notice of Allowance mailed Jun. 11, 2007, 6 pgs.

U.S. Appl. No. 10/643,585, RCE and Amendment and Response filed Apr. 23, 2007 to Final Office Action mailed Jan. 25, 2007 and the Advisory Action mailed Apr. 2, 2007, 15 pgs.

U.S. Appl. No. 10/643,585, Request for Continued Examination filed Sep. 14, 2006, 1 pg.

U.S. Appl. No. 10/643,585, Response to Rule 312 Communicaton mailed Jul. 23, 2007, 2 pgs.

U.S. Appl. No. 10/643,585 Notice of Allowance mailed Apr. 8, 2008, NOAR,2 pgs.

U.S. Appl. 10/643,586, Notice of Allowance mailed Oct. 23, 2007, 5 pgs.

U.S. Appl. No. 10/643,586, Advisory Action mailed Jan. 18, 2007, 3 pgs.

U.S. Appl. No. 10/643,586, Final Office Action mailed Oct. 19, 2006, 27 pgs.

U.S. Appl. No. 10/643,586, Non-Final Office Action mailed Feb. 8, 2006, 21 pgs.

U.S. Appl. No. 10/643,586, Non-Final Office Action mailed May 2, 2007, 36 pgs.

U.S. Appl. No. 10/643,586, Response filed Jan. 5, 2007 to Final Office Action mailed Oct. 19, 2006, 22 pgs.

U.S. Appl. No. 10/643,586, Response filed Aug. 1, 2006 to Non-Final Office Action mailed Feb. 8, 2006, 24 pgs.

U.S. Appl. No. 10/643,586 Response to Non-Final Office Action filed Sep. 4, 2007, 18 pgs.

U.S. Appl. No. 10/643,586 Response filed Feb. 16, 2007 to Advisory Action mailed Oct. 19, 2006, 18 pgs.

U.S. Appl. No. 10/643,587, Amendment and Response filed Aug. 13, 2007 to Non-Final Office Action mailed May 8, 2007, 20 pgs.

U.S. Appl. No. 10/643,587, Non-Final Office Action mailed May 8, 2007, 14 pgs.

U.S. Appl. No. 10/643,587, Final Office Action mailed Oct. 31, 2007, FOAR, 19 pgs.

U.S. Appl. No. 10/643,727, Non-Final Office Action mailed Feb. 16, 2006, 33 pgs.

U.S. Appl. No. 10/643,727, Non-Final Office Action mailed Aug. 11, 2006, 29 pgs.

U.S. Appl. No. 10/643,727, Notice of Allowance mailed Nov. 27, 2007, NOAR,5 pgs.

U.S. Appl. No. 10/643,727, Notice of Allowance mailed Feb. 28, 2007, 5 pgs.

U.S. Appl. No. 10/643,727, Notice of Allowance mailed Jul. 19, 2007, 5 pgs.

U.S. Appl. No. 10/643,727, Response filed Jan. 11, 2007 to Non-Final Office Action mailed Aug. 11, 2006, 20 pgs.

U.S. Appl. No. 10/643,727, Response filed Jun. 15, 2006 to Non-Final Office Action mailed Feb. 16, 2006, 21 pgs.

U.S. Appl. No. 10/643,738 Response filed Jan. 16, 2006 non-final office action mailed Sep. 26, 2005, 13 pgs.

U.S. Appl. No. 10/643,738 Response filed Jun. 19, 2006 non-final office action mailed Feb. 17, 2006, 10 pgs.

U.S. Appl. No. 10/643,738, Final Office Action mailed Apr. 17, 2007, 12 pgs.

U.S. Appl. No. 10/643,738, Non-Final Office Action mailed Nov. 1, 2007, 19 pgs.

U.S. Appl. No. 10/643,738, Non-Final Office Action mailed Feb. 17, 2006, 9 PGS.

U.S. Appl. No. 10/643,738, Non-Final Office Action mailed Sep. 26, 2005, 11 pgs.
U.S. Appl. No. 10/643,738, Response filed Jul. 17, 2007 final office action mailed Apr. 17, 2007, 17 pgs.
U.S. Appl. No. 10/643,741 Final Office Action mailed Sep. 11, 2007, 26 pgs.
U.S. Appl. No. 10/643,741, Amendment and Response mailed Nov. 13, 2007 to Final Office Action mailed Sep. 11, 2007, 14 pgs.
U.S. Appl. No. 10/643,741, Non-Final Office Action mailed Apr. 5, 2007, 19 pgs.
U.S. Appl. No. 10/643,741, Notice of Allowance mailed Feb. 12, 2008, NOAR,3 pgs.
U.S. Appl. No. 10/643,741, Response filed Jun. 4, 2007 to Non-Final Office Action mailed Apr. 5, 2007, 16 pgs.
U.S. Appl. No. 10/643,741, Supplemental Notice of Allowability mailed Mar. 25, 2008, 6 Pgs.
U.S. Appl. No. 10/643,742 Non-Final Office Action mailed Apr. 9, 2008, OARN,16 Pgs.
U.S. Appl. No. 10/643,742 Non-Final Office Action mailed Jun. 4, 2007, 13 pgs.
U.S. Appl. No. 10/643,742, Notice of Allowance mailed Nov. 7, 2007, 5 pgs.
U.S. Appl. No. 10/643,742 Response filed Oct. 11, 2007 to Non-Final Office Action mailed Jun. 4, 2007, 18 pages.
U.S. Appl. No. 10/643,754, Advisory Action mailed Nov. 22, 2006, 3 pgs.
U.S. Appl. No. 10/643,754, Amendment and Response filed Mar. 26, 2008 to Final Office Action mailed Sep. 26, 2007, 12 pages.
U.S. Appl. No. 10/643,754, Final Office Action Mailed Nov. 26, 2007, 29 pgs.
U.S. Appl. No. 10/643,754, Final Office action mailed Sep. 14, 2006, 21 pgs.
U.S. Appl. No. 10/643,754, Non-Final Office Action mailed Feb. 8, 2006, 16 pgs.
U.S. Appl. No. 10/643,754, Non-Final Office Action mailed Jul. 5, 2007, 23 pgs.
U.S. Appl. No. 10/643,754, Response filed Jan. 25, 2008 to Final Office Action mailed Nov. 25, 2007, 20 pgs.
U.S. Appl. No. 10/643,754, Response filed Nov. 7, 2006 to Final Office Action mailed Sep. 14, 2006, 12 pgs.
U.S. Appl. No. 10/643,754, Response filed Mar. 30, 2007 to Advisory Action mailed Nov. 22, 2006, 10 pgs.
U.S. Appl. No. 10/643,754, Response filed Jul. 10, 2006 to Non-Final Office Action mailed Feb. 8, 2006, 12 pgs.
U.S. Appl. No. 10/643,754, Amendment & Response filed Oct. 9, 2007 to Non-final OA mailed Jul. 5, 2007, 14 pgs.
U.S. Appl. No. 10/643,758, Notice of Allowance mailed Jan. 7, 2008, NOAR,4 pgs.
U.S. Appl. No. 10/643,758 Notice of Allowance mailed Oct. 19, 2007, 4 pgs.
U.S. Appl. No. 10/643,758, Notice of Allowance mailed Jul. 19, 2007, 4 pgs.
U.S. Appl. No. 10/643,758, Amendment and Response filed Jul. 10, 2006 to Final Office Action Mar. 10, 2006, 9 pgs.
U.S. Appl. No. 10/643,758, Final Office Action mailed Feb. 6, 2007, 23 pgs.
U.S. Appl. No. 10/643,758, Final Office Action mailed Mar. 10, 2006, 13 pgs.
U.S. Appl. No. 10/643,758, Non-Final Office Action mailed Aug. 15, 2006, 15 pgs.
U.S. Appl. No. 10/643,758, Non-Final Office Action mailed Aug. 30, 2005, 8 pgs.
U.S. Appl. No. 10/643,758, Response filed Jan. 30, 2006 to Non-Final Office Action mailed Aug. 30, 2005, 9 pgs.
U.S. Appl. No. 10/643,758, Response filed Dec. 14, 2006 to Non-Final Office Action mailed Aug. 15, 2006, 17 pgs.
U.S. App. No. 10/643,758, Response filed Apr. 17, 2007 to Final Office Action mailed Feb. 6, 2007, 25 pgs.
U.S. Appl. No. 10/643,767, Non-Final Office Action mailed Oct. 6, 2006, 7 pgs.
U.S. Appl. No. 10/643,769 Response filed Jul. 23, 2007 non-final office action mailed Apr. 23, 2007, 12 pgs.
U.S. Appl. No. 10/643,769, Non-Final Office Action mailed Apr. 23, 2007, 13 pgs.
U.S. Appl. No. 10/643,769, Notice of Allowance mailed Jan. 15, 2008, NOAR,4 pgs.
U.S. Appl. No. 10/643,769, Notice of Allowance Mailed Oct. 29, 2007, 17 pgs.
Cray Assembly Language (CAL) for Cray X1tm Systems Reference Manual, *Section 2.6, Memory Ordering,* http://docs.cray.com/books/S-2314-51/index.html,(Jun. 2003),302 pgs.
Deadlock-Free Routing Schemes on Multistage Interconnection Networks, *IBM Technical Disclosure Bulletin,* 35, (Dec. 1992),232-233.
ECPE 4504: Computer Organization Lecture 12: Computer Arithmetic, The Bradley Department of Electrical Engineering,(Oct. 17, 2000), 12 pgs.
International Search Report for corresponding PCT Application No. PCT/US2004/026814, (Mar. 10, 2005),2 pgs.
International Search Report for International Application No. PCT/IE 95/00047, *Date of Completion—Dec. 22, 1995; Authorized Officer—R. Salm.*
International Search Report for International Application No. PCT/US 95/15483, *Date of completion—Apr. 25, 1996; Authorized Officer—P. Schenkels.*
"Msync—Synchronise Memory with Physical Storage", *The Single UNIXÂ® Specification, Version 2: Msync, The Open Group,* http://www.opengroup.org/onlinepubs/007908799/xsh/msync.html,(1997), 3 pgs.
Adve, V. S., et al., "Performance Analysis of Mesh Interconnection Networks with Deterministic Routing", *Transactions on Parallel and Distributed Systems,* 5(5), (Mar. 1994),225-246.
Alverson, G. , et al., "Tera Hardware-Software are cooperation", *ACM,* FOAR,(1997),1-16 pgs.
Bolding, Kevin , "Non-Uniformities Introduced by Virtual Channel Deadlock Prevention", *Technical Report 92-07-07, Department of Computer Science and Engineering, FR-35 University of Washington;* Seattle, WA 98195, (Jul. 21, 1992).
Bolla, R. , "A Neural Strategy for Optimal Multiplexing of Circuit and Packet-Switched Traffic", *Proceedings, IEEE Global Telecommunications Conference,* (1992),1324-1330.
Boura, Y. M., et al., "Efficient Fully Adaptive Wormhole Routing in n-dimensional Meshes", *Proceedings, International Conference on Distributed Computing Systems,* (Jun. 1994),589-596.
Bundy, A. , et al., "Turning Eureka Steps into Calculations in Automatic Program Synthesis", *Proceedings of UK IT 90, (IEE Conf. Pub. 316) (DAI Research Paper 448),* (1991),221-226.
Chien, A. A., et al., "Planar-Adaptive Routing: Low-Cost Adaptive Networks for Multiprocessors", *Proceedings 19th International. Symposium on Computer Architecture,* (May 1992),268-277.
Cohoon, J. , et al., *C++ Program Design,* McGraw-Hill Companies, Inc., 2nd Edition,(1999),493.
Dally, W. J., et al., "Deadlock-Free Adaptive Routing in Multicomputer Networks Using Virtual Channnels", *IEEE Transactions on Parallel and Distributed Systems,* 4(4), (Apr. 1993),466-475.
Dally, William , et al., "Deadlock-Free Message Routing in Multiprocessor Interconnection Networks", *IEEE Transactions on Computers,* C-36, (May 1987),547-553.
Dally, William , "Performance Analysis of k-ary n-cube Interconnection Networks", *IEEE Transactions on Computers,* 39(6), (Jun. 1990),775-785.
Dally, W. J., "Virtual Channel Flow Control", *Proceedings, 17th International Symposium on Computer Architecture,* (May 1990),60-68.
Duato, J. , "A New Theory of Deadlock-Free Adaptive Routing in Wormhole Networks", *IEEE Transactions on Parallel and Distributed Systems,* 4(12), (Dec. 1993), 1320-1331.
Ernst, D. , et al., "Cyclone: A Broadcast-Free Dynamic Instruction Scheduler with Selective Replay", *30th Annual International Symposium on Computer Architecture (ISCA-2003),* (Jun. 2003), 10 pgs.
Gallager, Robert , "Scale Factors for Distributed Routing Algorithm", *NTC '77 Conference Record,* vol. 2, (1977),28:2-1-28:2-5.
Glass, C. J., et al., "The Turn Model for Adaptive Routing", *Proceedings, 19th International Symposium on Computer Architecture,* (May 1992),278-287.

Gravano, L., et al., "Adaptive Deadlock- and Livelock-Free Routing with all Minimal Paths in Torus Networks", *IEEE Transactions on Parallel and Distributed Systems,* 5(12), (Dec. 1994), 1233-1251.

Handy, J., "The Cache Memory Book", *Academic Press,* (1993),73-84.

Jesshope, C. R., et al., "High Performance Communications in Processor Networks", *Proc. 16th International Symposium on Computer Architecture,* (May 1989),pp. 150-157.

Kirkpatrick, S., et al., "Optimization by Simulated Annealing", *Science,* 220(4598), (May 13, 1983),671-680.

Kontothanassis, L., et al., "VM-based shared memory on low-latency, remote-memory-access networks", *Proceedings of the ACM ISCA '97,* (1997),157-169.

Linder, Daniel H., et al., "An Adaptive and Fault Tolerant Wormhole Routing Strategy for k-ary n-cubes", *IEEE Transactions on Computers*,40(1), (1991),2-12.

Lui, Z, et al., "Grouping Virtual Channels for Deadlock-Free Adaptive Wormhole Routing", *5th International Conference, Parallel Architectures and Languages Europe (PARLE '93),* (Jun. 14-17, 1993),254-265.

Nuth, Peter, et al., "The J-Machine Network", *Proceedings of the IEEE International Conference on Computer Design on VLSI in Computer & Processors,* (1992),420-423.

Patterson, D. A., et al., *Computer Architecture: A Quantitative Approach,* 2nd Edition, Morgan Kaufmann Publishers, Inc., San Francisco, CA,(1996),194-197.

Scott, S., "Synchronization and Communication in the T3E Multiprocessor", *ASPLOS,* vol. II, (1996),pp. 26-36.

Shumway, M, "Deadlock-Free Packet Networks", *Transputer Research and Applications 2, NATUG-2 Proceedings of the Second Conference of the North American Transputer Users Group,* (Oct. 18-19, 1989), 139-177.

Snyder, L., "Introduction to the Configurable, Highly Parallel Computer", *IEEE Computer 15*(1), (Jan. 1982),47-56.

Talia, D., "Message-Routing Systems for Transputer-Based Multicomputers", *IEEE Micro,* 13(3), (Jun. 1993),62-72.

Wang, Weilin, et al., "Trunk Congestion Control in Heterogeneous Circuit Switched Networks", *IEEE Transactions on Communications,* 40(7), (Jul. 1992), 1156-1161.

Wu, Min-You, et al., "DO and FORALL: Temporal and Spatial Control Structures", *Proceedings, Third Workshop on Compiliers for Parallel Computers, ACPC/TR,* (Jul. 1992),258-269.

Yang, C. S., et al., "Performance Evaluation of Multicast Wormhole Routing in 2D-Torus Multicomputers", *Proceedings, Fourth International Conference on Computing and Information (ICCI '92),* (1992),173-178.

Yantchev, J., et al., "Adaptive, Low Latency, Deadlock-Free Packet Routing for Networks of Processors", *IEEE Proceedings,* 136, Part E, No. 3, (May 1989),178-186.

U.S. Appl. No. 10/643,585 Non-Final Office Action Mailed On Sep. 15, 2008, 14 pgs.

U.S. Appl. No. 10/643,727, Notice of Allowance mailed Apr. 28, 2008, 5 pgs.

U.S. Appl. No. 10/643,741, Notice of Allowance mailed Jun. 9, 2008, 9 pgs.

U.S. Appl. No. 10/643,742, Response filed Oct. 9, 2008 to Non Final Office Action mailed Apr. 9, 2008, 15 pgs.

U.S. Appl. No. 10/643,754, Advisory Action mailed Feb. 8, 2008, 3 pgs.

U.S. Appl. No. 10/643,754, Non-Final Office Action mailed Jun. 25, 2008, 30 pgs.

\* cited by examiner

| DCACHE BYPASS | INITIAL REQUEST | TAG & STATE | FOQ INDEX MATCH | ACTION |||||||||
|---|---|---|---|---|---|---|---|---|---|---|---|---|
| | | | | MSG TO E | DS | FOQ ENTRY | E | D | P | ALLOCATE | ORB ENTRY | OTHER |
| NO | Read | MISS | NO | Read | | Dummy | | X | X | LRU Way | Read | |
| | | | YES | | | ReadUC | X | | | | Read nc† | |
| | | HIT | NO | | Read | | | | | | | |
| | | | YES ± | | | Read | X | | | | | |
| | ReadShared | MISS | NO | ReadShared | | Dummy | | X | X | LRU Way | Read | |
| | | | YES | | | ReadUC-Shared | X | | | | Read nc | |
| | | HIT | NO | | Read | | | | | | | |
| | | | YES ++ | | | Read | X | | | | | |
| | ReadNA | MISS | NO | ReadNA | | | | | | | Read | |
| | | | YES | | | ReadNA | X | | | | Read nc | |
| | | HIT | NO | | Read | | | | | | | |
| | | | YES | | | Read | X | | | | | |
| | Write | MISS | NO | ReadMod | | SWrite | X | X | X | LRU Way | Read | |
| | | | YES | | | SWrite | X | | | | | |
| | | HIT | NO | | | SWrite | X | X | | | | |
| | | | YES | | | | | | | | | |
| | WriteNA | MISS | NO | | | SWriteNA | X | | | | | |
| | | | YES | | | | | | | | | |
| | | HIT | NO | | | SWrite | X | X | | | | |
| | | | YES | | | | | | | | | |
| | Prefetch (to discard) | MISS | NO | | | | | | | | | |
| | | | YES | | | | | | | | | Discard |
| | | HIT | NO | | | | | | | | | |
| | | | YES | | | | | | | | | |

*FIG. 4D*

| DCACHE BYPASS | INITIAL REQUEST | TAG & STATE | FOQ INDEX MATCH | ACTION | | | | | | | |
|---|---|---|---|---|---|---|---|---|---|---|---|
| | | | | MSG TO E | D$ | FOQ ENTRY | E | D | P | ALLOCATE | ORB ENTRY | OTHER |
| YES | Read | MISS | NO | | | ReadUC | X | | | | Read nc | |
| | | | YES | | | | | | | | | |
| | | HIT | NO | | | | | | | Invalidate | | |
| | | | YES | | | | | | | | | |
| | ReadShared | MISS | NO | | | ReadUC-Shared | X | | | | Read nc | |
| | | | YES | | | | | | | | | |
| | | HIT | NO | | | | | | | Invalidate | | |
| | | | YES | | | | | | | | | |
| | ReadNA | MISS | NO | | | ReadNA | X | | | | Read nc | |
| | | | YES | | | | | | | | | |
| | | HIT | NO | | | | | | | Invalidate | | |
| | | | YES | | | | | | | | | |
| | Write | MISS | NO | | | SWrite | X | | | | | |
| | | | YES | | | | | | | | | |
| | | HIT | NO | | | | | X | | | | |
| | | | YES | | | | | | | | | |
| | WriteNA | MISS | NO | | | SWriteNA | X | | | | | |
| | | | YES | | | | | | | | | |
| | | HIT | NO | | | | | X | | | | |
| | | | YES | | | | | | | | | |
| | Prefetch (to discard) | MISS | NO | | | | | | | | | Discard |
| | | | YES | | | | | | | | | |
| | | HIT | NO | | | | | | | | | |
| | | | YES | | | | | | | | | |
| | IORead | | | | | ReadNA to IO space | X | | | | Read nc | |
| | IOWrite | | | | | SWriteNA to IO space | X | | | | | |
| | afadd ‡‡ | | | | | afadd (1 dw) | X | | | | Read nc | |
| | afax | | | | | afax (2 dw) | X | | | | Read nc | |
| | acswap | | | | | acswap (2 dw) | X | | | | Read nc | |
| | aadd | | | | | aadd (1 dw) | X | | | | | |
| | aax | | | | | aax (2 dw) | X | | | | | |
| | Lsync_s_v | | | | | Lsync_s_v | X | | | | | |
| | Lsync_v_s | | | | | Lsync_v_s | X | | | | | Hold IRQ |
| | Msync | | | | | Msync | X | | | | | Bypass Mode On |
| | Msync P Msync V | | | | | Msync | X | | | | | |
| | Gsync | | | | | Gsync | X | | | | | |

† A "Read nc" ORB entry specifies that the returning data will not be cached. Both ReadNA and ReadUC requests use "Read nc" ORB entries.
(A ReadNA tells the Ecache not to allocate the line. A ReadUC tells the Ecache that the P CHIP will not be caching the line but the Ecache still should.)
‡ Do more sophisticated match here (require pending or word match)   †† Do more sophisticated match here (require pending or word match)
‡‡ These five packet types are AMOs. The FOQ column indicates how many dwords of adat accompany the request.
Three of the AMOs return data, and two do not.

*FIG. 4E*

SYSTEM AND METHOD FOR PROCESSING MEMORY INSTRUCTIONS USING A FORCED ORDER QUEUE

RELATED APPLICATIONS

This application is related to the following U.S. patent applications:
- U.S. patent application Ser. No. 10/643,742, filed Aug. 18, 2003, titled "Decoupled Store Address and Data in a Multiprocessor System":
- U.S. patent application Ser. No. 10/643,586, filed Aug. 18, 2003, titled "Decoupled Scalar/Vector Computer Architecture System and Method":
- U.S. patent application Ser. No. 10/643,585, filed Aug. 18, 2003, titled "Latency Tolerant Distributed Shared Memory Multiprocessor Computer":
- U.S. patent application Ser. No. 10/235,898, filed Sep. 4, 2002, titled "Remote Translation Mechanism for a Multi-Node Systems" (now U.S. Pat. No. 6,922,766):
- U.S. patent application Ser. No. 10/643,754, filed Aug. 18, 2003, titled "Relaxed Memory Consistency Model": and
- U.S. patent application Ser. No. 10/643,727, filed Aug. 18, 2003, titled "Method and Apparatus for Indirectly Addressed Vector Load-Add-Store Across Multi-processors", each of which is incorporated herein by reference.

FIELD OF THE INVENTION

The present invention relates generally to the field of multi-processor systems, and more particularly to processing memory instructions in a multi-processor system.

BACKGROUND OF THE INVENTION

Multi-processor computer systems include a number of processing nodes connected together by an interconnection network. Typically, each processing node includes one or more processors, a local memory, and an interface circuit connecting the node to the interconnection network. The interconnection network is used for transmitting packets of information between processing nodes.

Distributed, shared-memory multiprocessor systems include a number of processing nodes that share a distributed memory element. By increasing the number of processing nodes, or the number of processors within each node, such systems can often be scaled to handle increased demand. In such a system, the processors may include one or more scalar processing units. These scalar processing units help control loading data from, and storing data to, addressable memory space in the distributed-memory system.

In order to load and store data, scalar processing units need to identify the proper address space for the data. In the past, individual nodes often have not had efficient or robust address identification mechanisms. In addition, such nodes often have not been able to handle multiple memory requests effectively (when scaling to large system size) or interface well with local cache requests and allocation.

Therefore, there is a need for a processing unit that addresses these and other shortcomings.

SUMMARY OF THE INVENTION

To address these and other needs, various embodiments of the present invention are provided. One embodiment of the invention provides a method for processing a memory instruction. In this embodiment, the method includes obtaining a memory instruction, obtaining one or more memory address operands, creating a virtual memory address using the one or more memory address operands, translating the virtual memory address into a physical memory address, and executing the memory instruction on a cache controller, wherein the cache controller uses the memory instruction and the physical memory address to determine whether to access a portion of a local or a remote cache. In some embodiments, the obtaining of the memory instruction includes obtaining a memory instruction selected from a group consisting of a scalar load instruction, a scalar store instruction, a prefetch instruction, a synchronization instruction, and an atomic memory operation (AMO) instruction.

Another embodiment provides a computerized method that includes obtaining a memory request, storing the memory request in a first memory request container, and processing the memory request from the first memory request container by a cache controller. The processing of the memory request from the first memory request container by the cache controller includes identifying a type of the memory request, processing the memory request in a local cache as a function of a first condition, and processing the memory request using a second memory request container as a function of a second condition, wherein the processing of the memory request using the second memory request container includes updating a portion of the local cache with a portion of a remote cache.

These and other embodiments will be described in the detailed description below.

BRIEF DESCRIPTION OF THE DRAWINGS

FIG. 4D illustrates a first portion of a table that provides processing details of an Initial Request Queue (IRQ) in the scalar load store unit, according to one embodiment of the present invention.

FIG. 4E illustrates a second portion of the table that provides processing details of an Initial Request Queue (IRQ) in the scalar load store unit, according to one embodiment of the present invention.

DETAILED DESCRIPTION

A novel system and method for processing memory instructions are described herein. In the following detailed description of the embodiments, reference is made to the accompanying drawings which form a part hereof, and in which are shown by way of illustration specific embodiments in which the invention may be practiced. These embodiments are described in sufficient detail to enable those who are skilled in the art to practice the invention, and it is to be understood that other embodiments may be utilized and that structural, logical and electrical changes may be made without departing from the scope of the present inventions. It is also to be understood that the various embodiments of the invention, although different, are not necessarily mutually exclusive. For example, a particular feature, structure or characteristic described in one embodiment may be included within other embodiments. The following description is, therefore, not to be taken in a limiting sense.

Figure 1A:
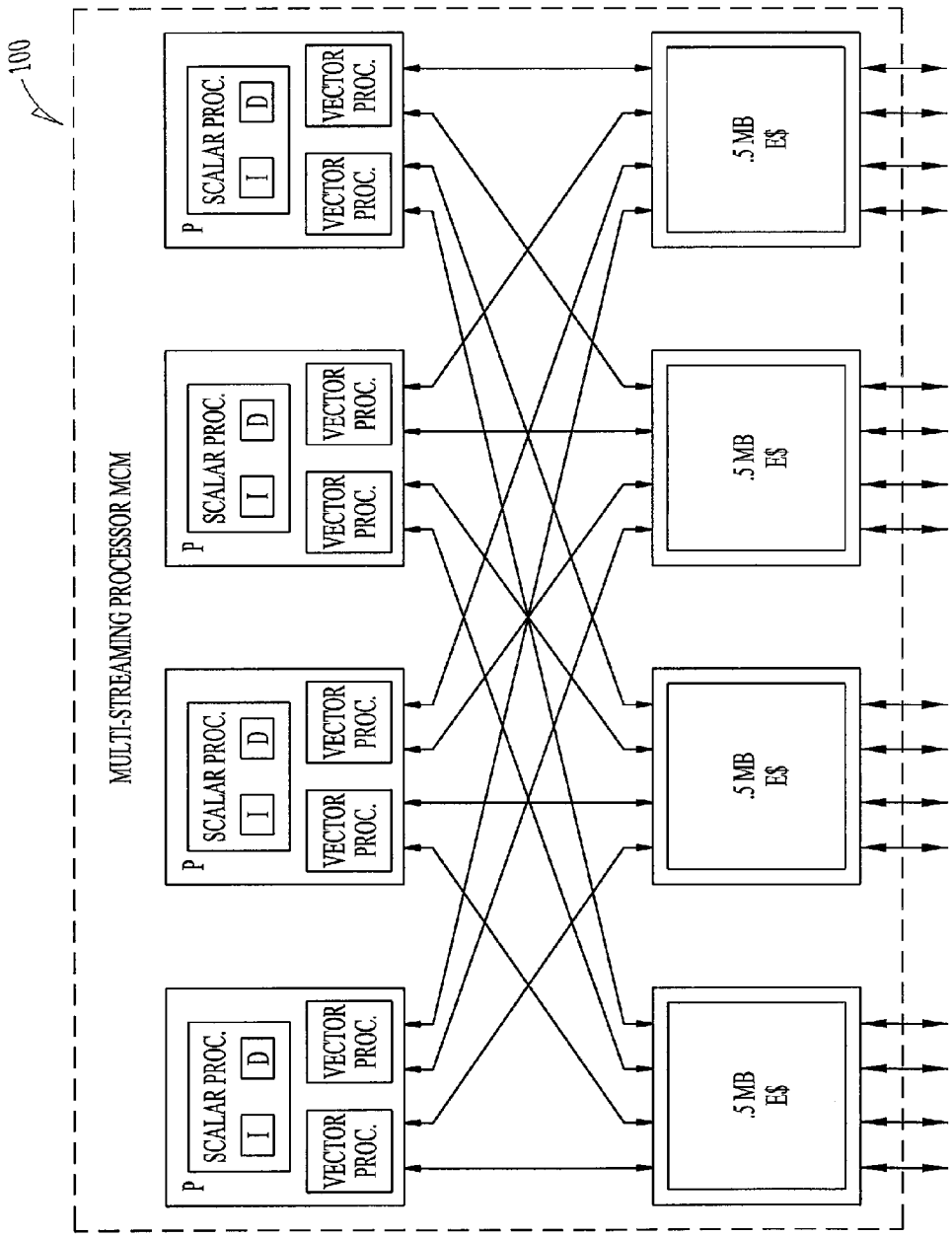
FIG. 1A illustrates a block diagram of a multi-streaming processor, according to one embodiment of the present invention.
Figure 1B:
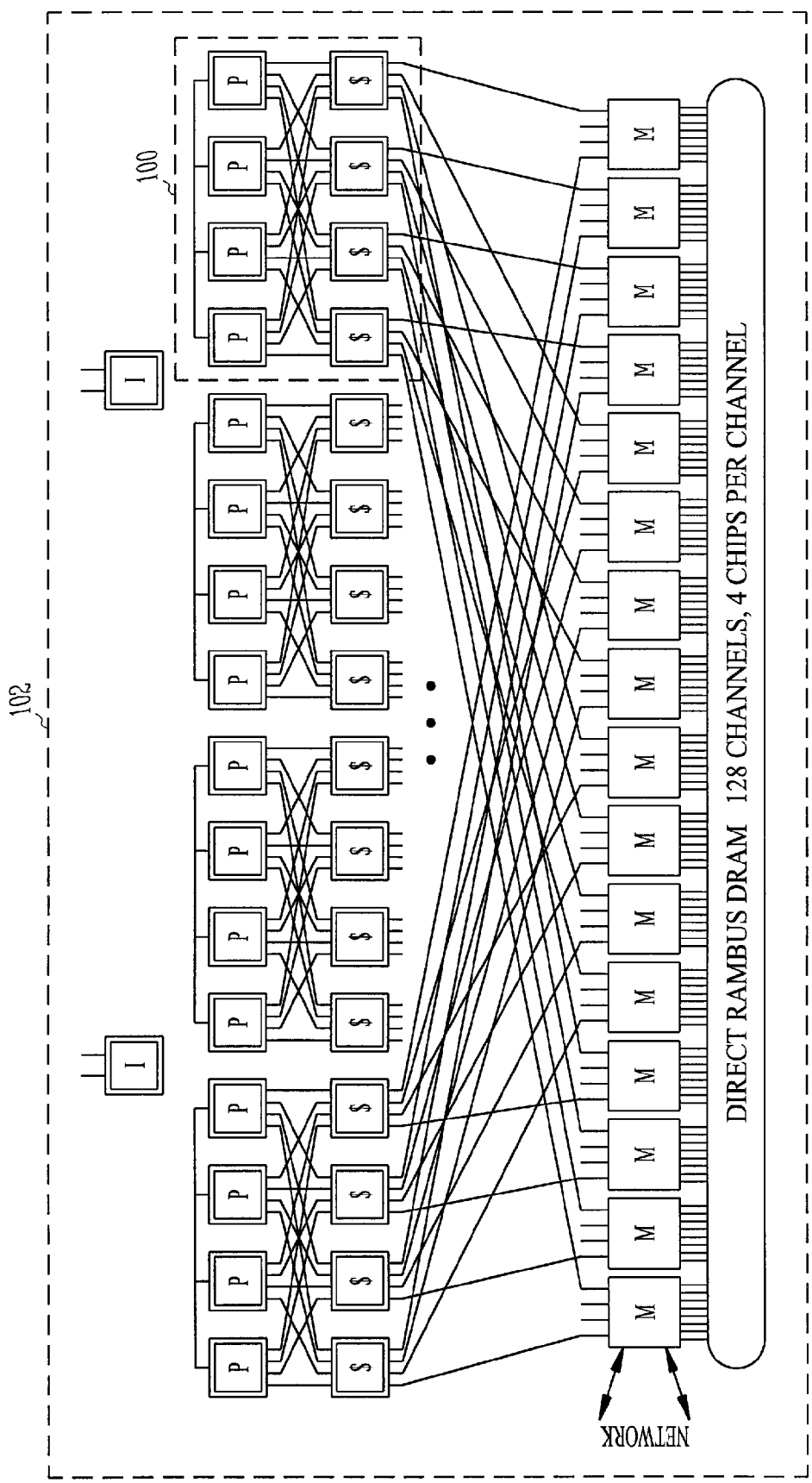
FIG. 1B illustrates a block diagram of a node that includes four multi-streaming processors, according to one embodiment of the present invention.

FIG. 1A and FIG. 1B illustrate specific hardware environments in which various embodiments of the present invention may be practiced. In one embodiment, the hardware environment is included within the Cray X1 System Architecture, which represents the convergence of the Cray T3E and the traditional Cray parallel vector processors. The X1 is a highly scalable, cache coherent, shared-memory multiprocessor that uses powerful vector processors as its building blocks, and implements a modernized vector instruction set.

FIG. 1A illustrates a block diagram of a multi-streaming processor (MSP), according to one embodiment. In this embodiment, MSP 100 is an eight-chip multi-chip module having four processor chips (P chips) and four custom cache chips (E chips). Each P chip contains a superscalar processor with a two-pipe vector unit, and the E chips implement a 2 MB cache (0.5 MB each) that is shared by the P chips. Each P chip contains a small Dcache that is used for scalar references only, and the E chips are shared by all P chips for scalar data, vector data and instructions.

Each P chip has many features. The scalar and vector units support 32- and 64-bit operations on both integer and floating-point data. Most all computational functions, including the register files, are built using full custom logic for maximum speed and reduced area and power. The remaining logic is implemented in a standard-cell form (which is faster and more dense than a gate-array implementation). The scalar engine is 2-way dispatch, out-of-order issue, in-order completion with 2-deep branch prediction. There are 64 A registers and 64 S registers. The A registers are generally used to hold addresses and address/integer calculations. The S registers hold the results of either integer or floating-point calculations. S register values can also be used in vector/scalar operations (where a single value is used in conjunction with the multiple values of vector registers). The scalar engine has a 16 KB instruction cache and a 16 KB write through data cache. There are 32 vector registers of 64 elements each, implemented in two vector pipelines. (Thus the depth of each pipe is 32 elements.) Most 32-bit vector operations take place at twice the rate as for 64-bit operations. Multiple mask registers are implemented which will enable more codes to support higher levels of vectorization. Special instructions and hardware support are added to enable the four P chips to cooperate on single job streams. Both 32-bit and 64 bit word sizes are supported. The A registers implement 32 and 64 bit integer functions while the S registers support the same integer functions and additionally support 32-bit and 64-bit floating point arithmetic. The vector pipes support 32- and 64-bit integer operations and 32- and 64-bit floating point operations. Each E chip has 0.5 MB of cache, tag support, coherency directories, extensive data routing, and support for synchronization. The E chips and P chips are IBM CMOS ASIC's.

Each scalar processor of a P chip delivers a peak of 0.8 Giga-instructions per second and 800 MFlops at a 400 MHz clock rate. The two vector pipes in each P chip provide 3.2 GFlops, with a logic clock (Lclk) of 400 MHz and a custom functional unit clock (Sclk) of 800 MHz. The links between the vector processors and the E chips are single-ended, 400 Mbaud, and include a 64-bit outgoing address/store data path, and a 64-bit incoming load data path plus miscellaneous control wires. Each E chip has four system ports to the local memory and network. These links are differential, 800 Mbaud, and include 16 data bits wide in each direction plus miscellaneous control wires.

Each scalar processor has a 16 KB Dcache. The Dcache functions in write-through mode, and is kept coherent with the E chips (Ecache) through selective invalidations performed by the E chips. The scalar processors and the vector units share E chips. The E chips are responsible for enforcing ordering of memory references between processors as dictated by local memory synchronization instructions.

The scalar processors of P chips have many attributes, including nominal 400 MHz operation outside the custom logic. This includes instruction dispatch and issue. The scalar processors have two-way, superscalar dispatch (thus 0.8 Giga-operations per sec), and can issue up to two S register, two A register, 1 Load/Store, 1 Branch or 1 Vector instruction each clock. The scalar unit and V register pipelines each have three functional unit groups that are independent and are pipelined. Each of the functional unit groups can perform two operations per clock, thus giving twice the result rate as with single functional units. The functional units are: 1—add, logical, compares; 2—multiply, shift; 3—divide, logical, converts, specials (POP, BMM, etc.). Some integer functions are executed only from the S registers. The A and S registers support integer divides. The S registers also support floating point divide. (Floating divide only occurs in vectors.) The scalar processors provide 64 logical and 512 physical A and S registers. Register shadowing is used rather than general register renaming. (Each logical A and S register has 8 shadow registers). Branch prediction and speculative execution are also provided. Scalar instructions can execute speculatively, while vector instructions do not. The scalar processors have on-chip instruction caches of 16 KBytes, which are 2-way set-associative. 32-byte cache lines are used. The scalar processors also have on-chip data caches of 16 KBytes. These caches are used in a write-through mode. Load instructions can bypass the cache (no allocate). Cache lines are also 32 bytes. There are multiple Sync instructions useful on both a local basis and global basis (across all MSP's in a system).

The vector processors in the P chips each include 32 vector registers, each of 64 elements. There are 64 elements in a vector, both in 32- and 64-bit modes. Both floating-point operations and integer/logical/shift functions are provided. A two-pipe vector unit is provided in a vector processor, so that each pipe has 32 elements of all vector registers. Operation is overlapped and chained. The vector processors have custom circuits running at 800 MHz. These are used to speed up the vector register/mux/functional unit pipelines. Thus, the total vector flops are 3.2 GFlops per P chip, and 12.8 GFlops for the MSP. Vectors are decoupled from the scalar unit to allow the scalar unit to run ahead. The vector processors provide full support for 32-bit operands. 32-bit computations execute twice as fast as 64-bit. Stride-1 memory operations (the most common case) using 32-bit data are also executed at twice the rate. 32-bit operands will be stored two to a 64-bit vector element, but the operands in an element might not be consecutive (probably n and n+2). The way in which 32-bit operands are supported is determined by the Cray SV2 implementation (for this embodiment), and is not visible at the instruction-set level. The vector pipes each have a functional unit for Mask operations, in addition to the units listed above for the scalar processor.

FIG. 1B illustrates a block diagram of a node that includes four multi-streaming processors (MSP's), according to one embodiment. In this embodiment, node 102 includes each MSP 100 in a four MSP system. Node 102 is contained on a single printed circuit board. The sixteen M chips on node 102 contain memory controllers, network interfaces and cache coherence directories with their associated protocol engines. The memory system is sliced across the 16 M chips, round robin by 32-byte cache lines. Each M chip supports one slice. Bits 5 and 6 of the physical address determine the E chip with a processor, and bits 7 and 8 further specify one of four M chips connected to each E chip.

Each M chip resides in one of sixteen independent address slices of the machine, and the interconnection network provides connectivity only between corresponding M chips on different nodes. All activity (cache, memory, network) relating to a line of memory stays within the corresponding slice. Each M chip controls a separate sector of a slice. Slices expand (get more memory in each) as nodes are added so the number of sectors in each slice is equal to the number of nodes in a system.

Total peak local memory bandwidth for one node is 204.8 GB/s, or 51.2 GB/s per MSP. As each MSP 100 needs a maximum bandwidth of about 45 GB/s, there is bandwidth to support network traffic and I/O without greatly impacting computational performance. Each M chip contains two network ports, each 1.6 GB/s peak per direction.

Node 102 also contains two I chip I/O controller ASICs. These connect to the M chips and provide four I/O ports of 1.2 GB/s bandwidth, full duplex, off node 102. Each I chip contains two ports, 400 MB/s full duplex connections to 8 of the local M chips (one I chip connects to the even M chips and the other connects to the odd M chips), and a 1.6 GB/s full duplex connection to the other I chip. The total I/O bandwidth per module is thus 4.8 GB/s full duplex.

The memory on node 102 is distributed across the set of 16 M chips. Each M chip directly controls the resources contained on two daughter boards so that there are thirty-two daughter boards on node 102. The memory chips in the daughter boards are Direct Rambus DRAM. These chips have 16 internal banks and have 18 data pins that each run, with a 400 MHz clock, at an 800 Mbaud rate. Each chip then has a 1.6 GB/s read/write data rate. Being 18 bits wide, additional parts to support ECC are not needed. Daughter cards contain 16 chips organized into 4 memory channels of 4 chips each. Each memory channel is independent. Channels have a peak data bandwidth of 1.6 GB/s, so that the card supports a bandwidth of 6.4 GB/s. With 16 banks in a memory chip, a channel has 64 memory banks. Daughter cards with 64 Mbit, 128 Mbit, 256 Mbit or 512 Mbit chips are supported. The design also accommodates chip densities of 1 Gbit if and when they become available, assuming they fit in the design envelope (size, power, etc.). As the memory parts are 18 bits wide instead of 16 in order to support ECC, the chip's bit densities are actually 72, 144, 288, 576 and 1152 Mbits.

Memory ordering, when required, can be provided in the four MSP node and between MSPs of different nodes by using one of the Sync instructions. In one embodiment, there are three different Sync instructions: Lsync instructions, Msync instructions, and Gsync instructions.

Lsyncs provide ordering among vector and scalar references by the same processor. The Lsync_s_v instruction guarantees that previous scalar references complete before subsequent vector references. The Lsync_v_s instruction guarantees that previous vector references complete before subsequent scalar references. Finally, the Lsync_v_v instruction guarantees that previous vector references complete before subsequent vector references. There are also a few other varieties that provide even lighter-weight guarantees. These instructions are used when the compiler or assembly language programmer either knows of a data dependence, or cannot rule out the possibility of a data dependence between the various classes of memory references.

Msyncs provide ordering among memory references by the processors of an MSP. The Msync instruction is executed independently on multiple processors within the MSP (typically by either all processors, or a pair of processors performing a "producer/consumer" synchronization). The Msync instruction includes a mask indicating which processors are participating, and all participating processors should use the same mask, or else hardware will detect the inconsistency and cause an exception. The regular Msync orders all previous references by all participating processors within the MSP before all subsequent references by all participating processors. It is essentially a memory barrier and control barrier wrapped into one. The vector Msync acts the same, but only applies to vector references. Lastly, the producer Msync is intended to situations in which one processor is producing results for one or more other processors to consume. It doesn't require the producer to wait to see earlier results possibly written by the "consumers." Msyncs are highly optimized in this embodiment. Vector store addresses are sent out to the E chips long before the actual data is available; the store data are sent along later. Load requests that occur after an Msync are checked against the earlier store addresses. If there is no match, the loads are serviced, even before the data for stores occurring before the Msync have been sent to the E chip.

Gsyncs provide ordering among references made by multiple MSPs. They are generally used whenever data is shared (or potentially shared) between MSPs. Like Msyncs, Gsyncs include a mask of participating processors within an MSP, and all participating processors should issue a Gsync with a consistent mask. The regular Gsync prevents any subsequent memory references by the participating processors from occurring until all previous loads have completed and all previous stores have become globally visible. A Gsync should be used, for example, before performing a synchronization operation (such as releasing a lock) that informs other processors that they can now read this processor's earlier stores. Several variants of Gsync are provided, including versions optimized for lock acquire and lock release events.

Figure 2A:
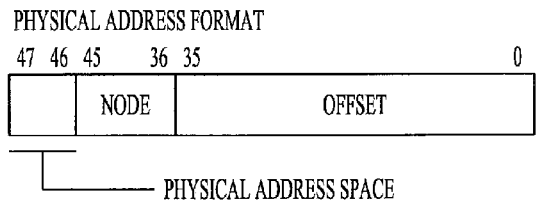
FIG. 2A illustrates a format for a physical memory address, according to one embodiment of the present invention.

FIG. 2A illustrates a format for a physical memory address, according to one embodiment. In this embodiment, a 46-bit (64 TBytes) physical memory address is supported. The node size for this embodiment is a board containing four MSP's and 16 M chips. Physical memory address format 200 contains bits 47 . . . 0. Bits 35 . . . 0 represent an offset (into memory). Bits 45 . . . 36 represent the node. Bits 47 . . . 46 represent the physical address space. The physical memory format allows for up to 1024 nodes (4096 MSP's) and 64 GBytes of physical memory per node. Physical pages are allocated on a per-node basis. That is, any given physical page is distributed uniformly across the 16 sectors (the memory controlled by a given M chip) of a single node. This embodiment provides three parallel, physical address spaces, which are selected by two extra bits at the top of the physical address.

Figure 2B:
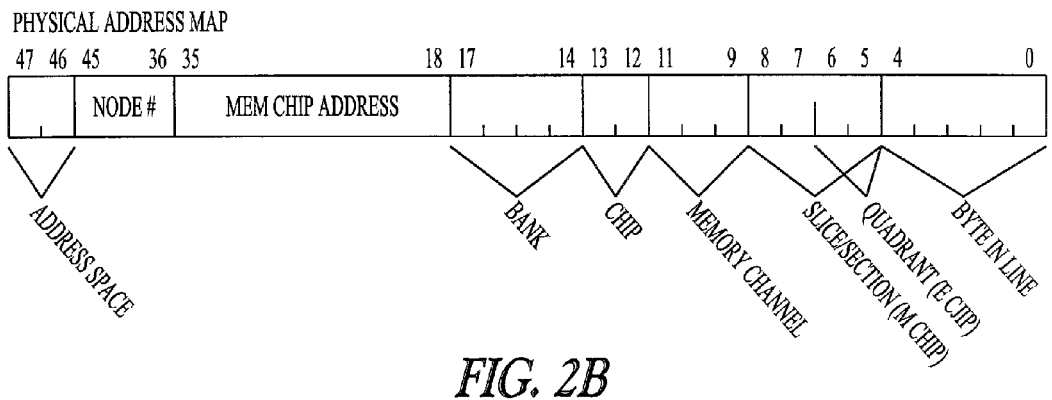
FIG. 2B illustrates a more detailed map of the physical memory address format shown in FIG. 2A, according to one embodiment of the present invention.

FIG. 2B illustrates a more detailed map of the physical memory address format shown in FIG. 2A, in one embodiment. The mapping of a physical address to a destination location is dependent on the hardware implementation (as opposed to being specified in the user-level architecture). Address mapping should be done so that parallelism can be easily exploited by having the map such that multiple transactions can be requested and satisfied simultaneously with minimum hardware complexity. Bits 4 . . . 0 represent the byte in the line. Bits 6 . . . 5 represent the quadrant (E chip). Bits 8 . . . 5 collectively represent the slice/section (M chip). Bits 11 . . . 9 represent the memory channel. Bits 13 . . . 12 represent the memory chip for the memory channel, and bits 17 . . . 14 represent the bank for the memory chip. Bits 35 . . . 18 represent the memory chip address, and bits 45 . . . 36 represent the node number (in the system). Bits 47 . . . 46 represent the address space. Memory size options and configuration changes (including memory degrades) can modify this map. The map supports memory chips up to 1 Gbit density. There are three address spaces: coherent main memory, memory-mapped register space, and I/O device space. Coherent main memory may be cached.

Figure 3:
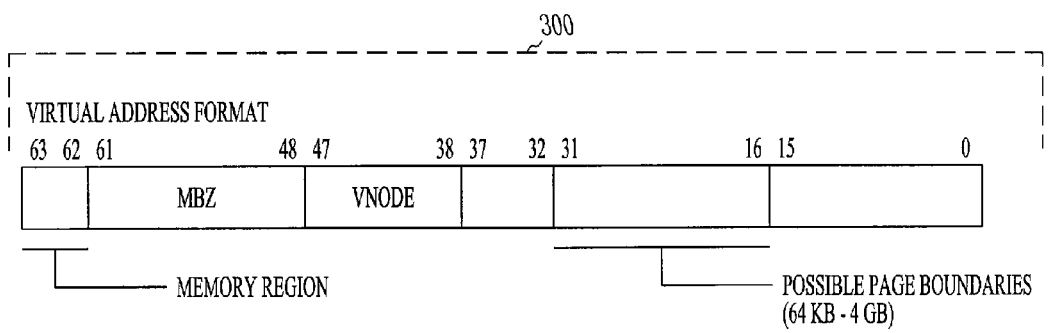
FIG. 3 illustrates a format for a virtual memory address, according to one embodiment of the present invention.

FIG. 3 illustrates a format for a virtual memory address, according to one embodiment. In this embodiment, virtual memory address format 300 contains a 64-bit virtual address space. Bits 37 . . . 0 represent a virtual offset into virtual memory space, wherein potential page boundaries range from 64 KB to 4 GB. Bits 47 . . . 38 represent the VNode (i.e., virtual node). This is used by the hardware when performing remote address translation. Bits 61 . . . 48 should be set to zero in this implementation. Bits 63 . . . 62 specify the memory region, which determines the type of address translation used in kernel mode. The virtual address space can be considered a flat virtual address space for uniprocessor, or symmetric multiprocessing applications. As stated, this embodiment supports eight page sizes ranging from 64 KB to 4 GB. Thus, the page boundary can vary, from between bits 15 and 16, to between bits 31 and 32.

In various embodiments of the invention, virtual addresses used for instruction fetches and data references are first translated into physical addresses before memory is accessed. These embodiments support two forms of address translation: source translation, and remote translation. The first form of address translation is source translation, in which a virtual address is fully translated by a Translation Look-aside Buffer (TLB) on a local P chip to a physical address on an arbitrary node. The second form of address translation is remote translation, in which the physical node number is determined by a simple translation of the virtual address VNode field, and the remaining virtual address VOffset field is sent to the remote node to be translated into a physical address offset via a Remote-Translation Table (RTT). The type of address translation performed is based upon values in the TLBControl control register and the virtual address itself. Remote translation is performed if all of the following three conditions are true: (1) Remote translation is enabled (TLBcontrol.RemoteTrans=1); (2) The virtual address is to the used region (Bits 63 . . . 62=00 in the virtual address); and (3) The virtual address references a remote node (Bits 47 . . . 38 in the virtual address are not equal to TLBcontrol.MyNode). If any of the above conditions are false, then source translation is performed. Remote translation can be enabled/disabled on a per-processor basis.

Figure 4A:
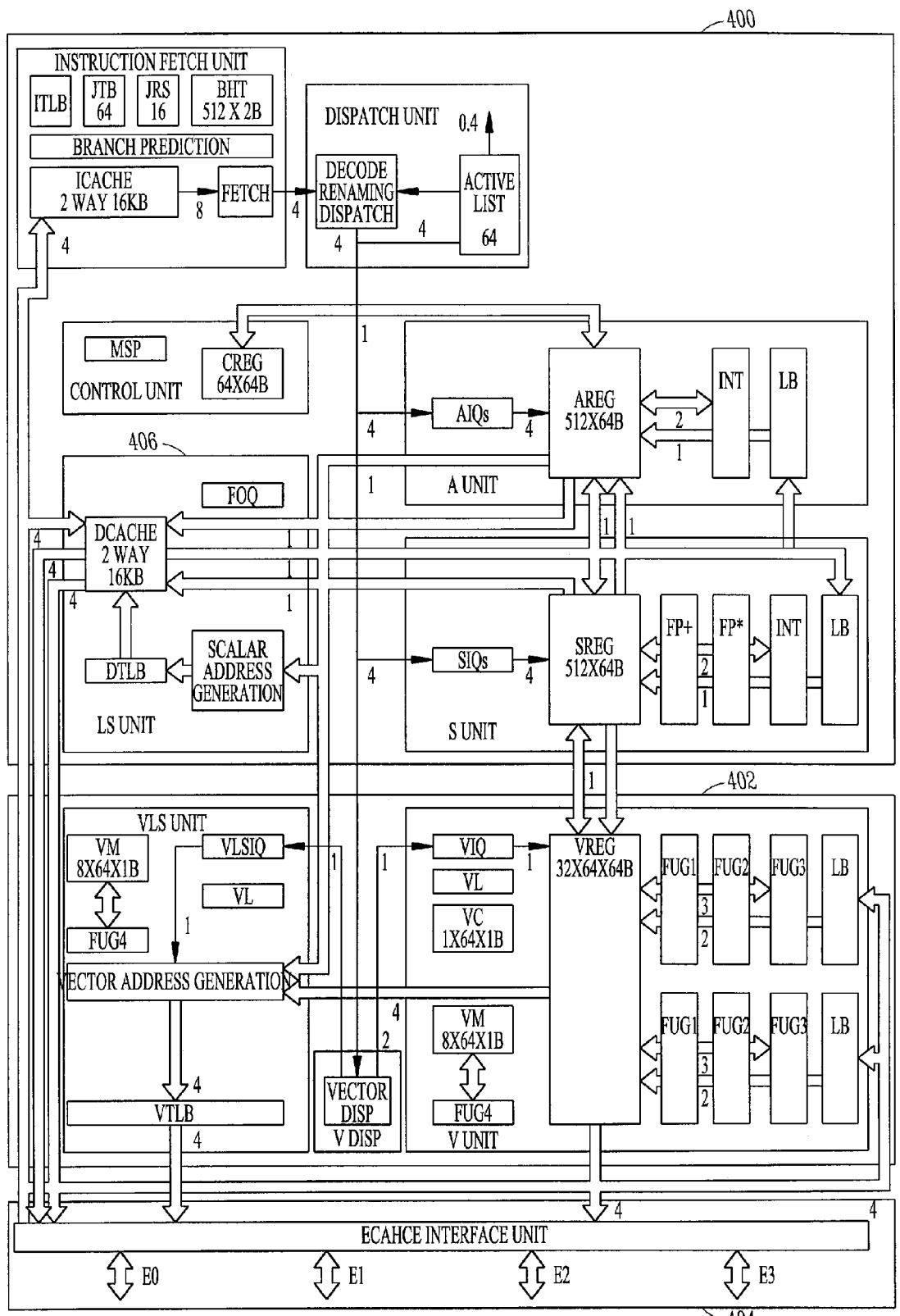
FIG. 4A illustrates a block diagram of a P chip having a scalar load store unit, according to one embodiment of the present invention.

FIG. 4A illustrates a block diagram of a P chip having a scalar load store unit, according to one embodiment of the present invention. In this embodiment, the P Chip contains three sections. One is Scalar Section (SS) 400. SS 400 is an out-of-order, two-way issue superscalar processor and contains the Instruction Fetch Unit (IFU), the Dispatch Unit (DU), the AS Unit (ASU), the Load/Store Unit (LSU) 406, and the Control Unit (CU). Another section is Vector Section (VS) 402. VS 402 contains the Vector Dispatch Unit (VDU), the Vector Unit (VU) and the Vector Load/Store Unit (VLSU). This section contains a two-pipe vector processor capable of executing eight floating-point operations and four memory operations per Lclk. The final section is Memory Interface Section (MS) 404. MS 404 contains the Ecache Interface Unit (EIU), which communicates with the E Chips to ensure high bandwidth between the SS/VS and the external cache. The P Chip uses three copies of a Custom Block (CB) in two different units. The ASU and VU use a common custom block for its large register file and fast functional units. The ASU uses one copy of the CB while the VU uses two copies, one for each vector pipe.

In this embodiment, SS 400 is a high performance superscalar processor. It dispatches, in-order, up to two instructions per Lclk, executes instructions out-of-order within the various units, and then graduates in-order up to two instructions per Lclk. SS 400 also implements speculative execution, register renaming, and branch prediction to allow greater out-of-order execution. SS 400 can predict up to two branch instruction, and uses a Branch History Table (BHT), a Jump Target Buffer (JTB), and Jump Return Stack (JRS) to help insure a high branch prediction rate. SS 400 also contains two 64-bit wide register files, A Registers (AR) and S Registers (SR). The AR's are used mainly for address generation. There are 64 logical AR's and 512 physical AR's that are renamed. The SR's are used for both integer and floating-point operations. There are 64 logical SR's and 512 renamed physical SR's.

SS 400 is capable of issuing up to two integer operations per Lclk using the AR's and up to one SR instructions per Lclk that can be either integer or floating point. The decoupled LSU of SS 400 can issue, in order, one load or store per Lclk, which may then execute out-of-order with respect to previous scalar memory operations. SS 400 is also able to issue one branch instruction per Lclk, which allows one branch prediction to be resolved per Lclk. SS 400 includes separate first level of caches for instructions and scalar data.

The Instruction Cache (Icache) is 16 KBytes in size and is two-way set associative. Each Icache line is 32 Bytes. The Data Cache (Dcache) is also 16 KBytes and two-way set associative with a 32 Byte line size. The Icache is virtually indexed and virtually tagged while the Dcache is virtually indexed and physically tagged. The Dcache is write through.

All instructions flow through the P Chip's units by first being fetched by the IFU, and then sent to the DU for distribution. In the DU, instructions are decoded, renamed, and entered into the Active List (AL).

Instructions can enter the AL in a speculative state. Speculative instructions may execute, but their execution cannot cause permanent processor state changes while the instructions remain speculative. Instructions in the AL proceed from speculative, to scalar committed, to committed and then to graduated. Scalar committed and committed instructions are not branch speculative. After commitment, an instruction proceeds to graduated and is removed from the AL. Instructions cannot be marked complete until the instruction can be removed from the AL, and at least requires that all trap conditions are known, all scalar operands are read, and any scalar result is written.

Scalar instructions are dispatched by the DU in program order to the AU and/or the SU. Most scalar instructions in the AU and SU are issued out-of-order, read the AR or SR, execute the indicated operations, write the AR or SR and send instruction completion notice back to the DU. The DU then marks the instruction complete and can graduate the scalar instruction when it is the oldest instruction in the AL. All scalar memory instructions are dispatched to the AU. The AU issues the memory instructions in-order with respect to other scalar memory instructions, reads address operands from AR and sends the instruction and operands to LSU 406. For scalar store operations, the memory instruction is also dispatched to the AU or SU to read the write data (to be stored) from the AR or SR and send this data to LSU 406.

LSU 406 performs address translation for the memory operations received from the AU in-order, sends instruction commitment notice back to the DU, and executes independent memory operations out-of-order. For scalar loads, when load data is written into the AR or SR, the AU or SU transmits instruction completion notice back to the DU. Scalar store instruction completion is sent by the Ecache Interface Unit (EIU) to the DU when the write data has been sent off to the E chip.

Branch instructions are predicted in the IFU before being sent to the DU. The DU dispatches the branch instruction to either the AU or SU. The AU or SU issues the instruction, reads AR or SR, and sends the operand back to the IFU. The IFU determines the actual branch outcome, signals promote or kill to the other units and sends completion notice back to the DU.

Vector instructions are dispatched in-order from the DU to the VDU. The VDU dispatches vector instructions to both the VU and VLSU in two steps. First, all vector instructions are vpredispatched in-order in the VDU after all previous instructions are scalar committed. The VDU separates the stream of vector instructions into two groups of vector instructions, the VU instructions and VLSU instructions. All vector instructions are sent to the VU, but only vector memory instructions and instructions that write VL and VM sent to the VLSU.

Figure 4B:
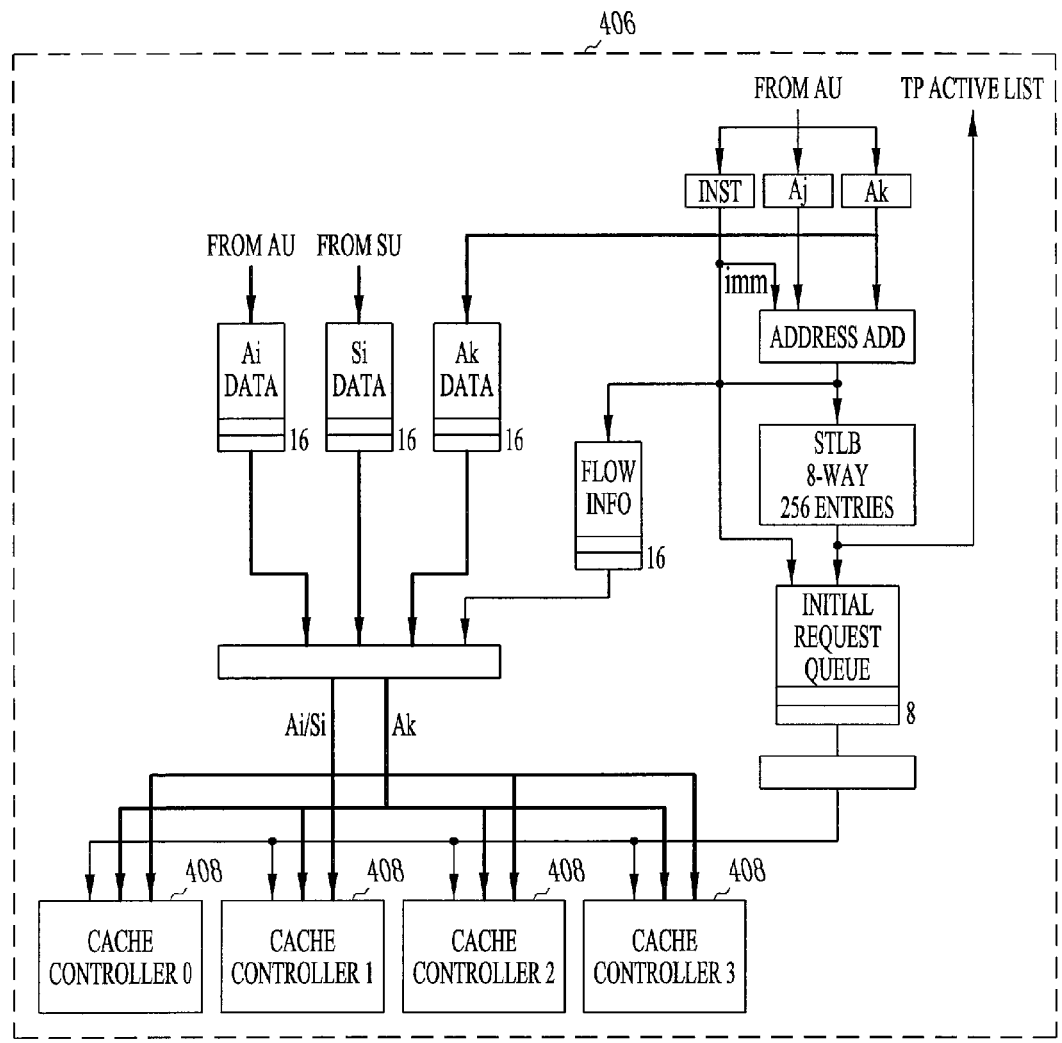
FIG. 4B illustrates a more detailed block diagram of the scalar load store unit, according to one embodiment of the present invention.

FIG. 4B illustrates a more detailed block diagram of the scalar load store unit, according to one embodiment of the present invention. In this embodiment, LSU 406 includes an address generator and four cache controllers (408). Each cache controller 408 contains an interface to one of the four Ecache ports, and the portion of the Dcache associated with that port.

LSU 406 processes scalar loads, scalar stores, prefetches, syncs, and atomic memory operations. Instructions are received from the A Unit (AU), and can be processed when the address operands (Aj and optionally Ak) have arrived. The address add is performed for prefetches and all aligned loads and stores to generate a virtual address. Atomic Memory Operations (AMO's) and unaligned loads and stores use Aj directly as an address. All instructions that reference memory (all but the syncs) are then translated as needed (using either source or remote translation, as described earlier), and checked for address errors. Accesses to the kphys memory region are not translated. The TLB reports completion of translation and any errors back to the Active List.

After the TLB, instructions are placed into the Initial Request Queue (IRQ). The IRQ is a container, and contains 8 entries, allowing up to 8 scalar references to be translated after an "Lsync V,S" instruction before the Lsync completes. While these scalar references can't access the Dcache until the Lsync completes, allowing them to pass translation can permit subsequent vector instructions to be dispatched, which will improve performance for certain loops.

From the IRQ, instructions are sent to one of the four Cache Controllers 408 (CC0-CC3), steered by physical address bits 6 . . . 5. Sync instructions are broadcast to each of the four cache controllers 408. The Flow Info Queue maintains steering information for scalar store and AMO data values. Each entry records the type of operand(s) and the port to which they should be steered. Data values arrive in order from each of the AU and SU, and are steered accordingly. Ak values are used only for AMO's with two operands.

Figure 4C:
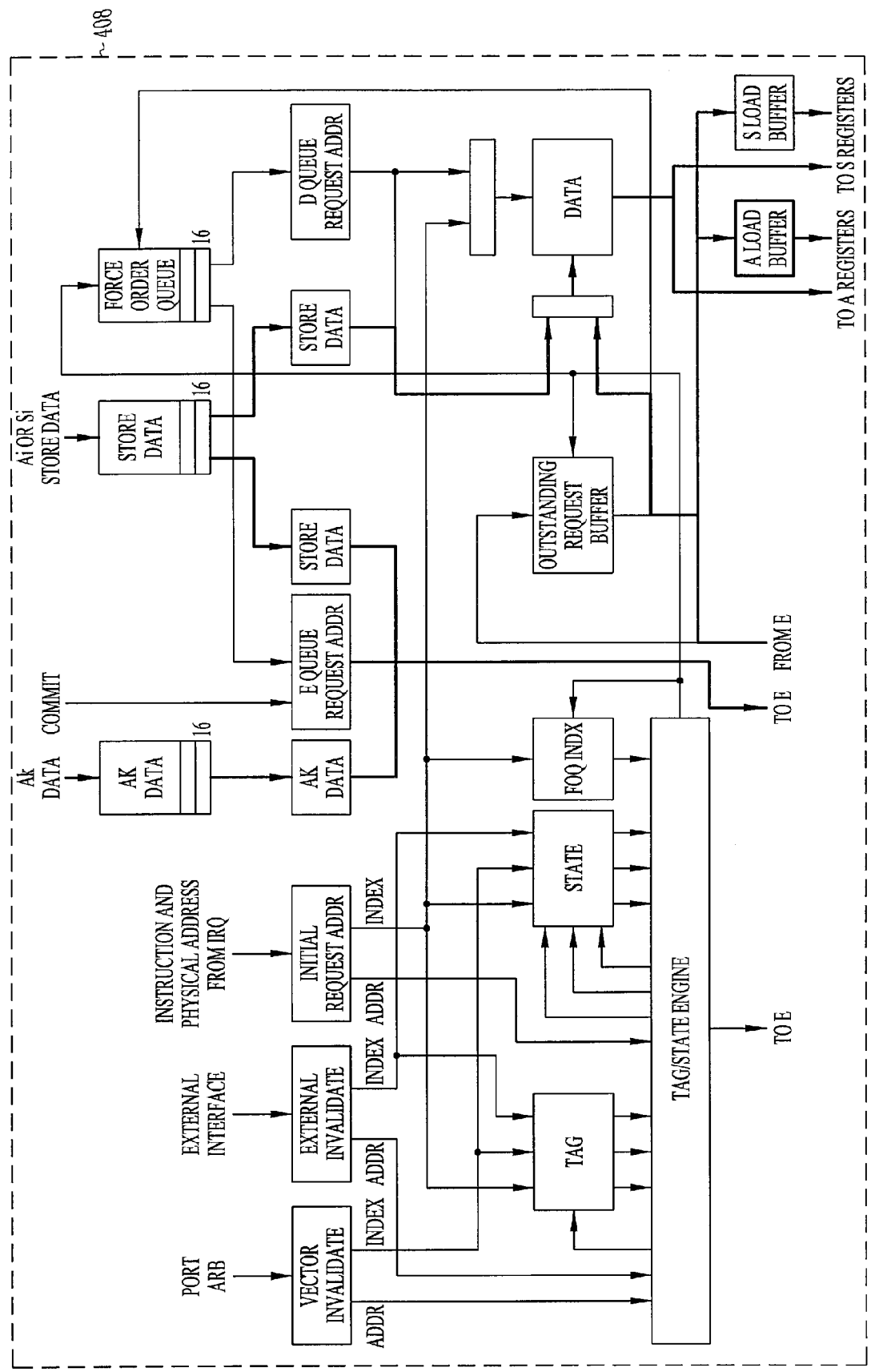
FIG. 4C illustrates a block diagram of a cache controller in the scalar load store unit, according to one embodiment of the present invention.

FIG. 4C illustrates a block diagram of a cache controller in the scalar load store unit, according to one embodiment of the present invention. Controller 408 contains the tag, state and data arrays for that portion of the Dcache corresponding to Ecache port 'x' (i.e.: having physical address bits 6 . . . 5='x'). It includes two primary request-processing pipelines: the IRQ, from the address generation logic, and the Forced Order Queue (FOQ), through which requests are routed when they cannot be serviced immediately from the IRQ. Both the IRQ and FOQ are containers that are able to both hold and service requests.

Physical address bits 12 . . . 7 of a request are used as the index into the local Dcache (which contains 64 indices times two ways, for a total of 128 cache lines). A request from the IRQ simultaneously indexes into the Dcache tag, state and data arrays, and also performs an associative, partial address match with all entries in the FOQ. The indices and control information for all FOQ entries are replicated for this purpose in the FOQ index array. No request is allowed to leave the IRQ until it is not branch speculative.

Read requests that hit in the Dcache and have no potential matches in the FOQ are serviced immediately. Read and write requests that miss in the Dcache and have no potential matches in the FOQ cause the line to be allocated in the Dcache. A request packet is sent to the Ecache immediately, and the instruction is placed into the FOQ to await the response from the E chip. In the case of a Dcache allocation, the state of the line is immediately changed to valid; there is no "pending" state. The simple presence of a request for a given line in the FOQ serves the same purpose as a pending state. A subsequent request to the line that is processed from the IRQ before the newly-allocated line has arrived back from the E chip will detect the matching request in the FOQ and will thus not be satisfied from the Dcache. If a new request from the IRQ matches the partial address of any valid entry in the FOQ, then there is a potential exact address match with that entry, and the request is routed through the FOQ to maintain proper request ordering. All AMO's and I/O widget space references are sent through the FOQ, as they do not allocate Dcache lines and can never be serviced from the Dcache. Requests that miss in the Dcache and would otherwise have allocated a Dcache line do not do so when they match an FOQ entry; they are run through the FOQ and passed on to the Ecache. Simplifying the handling of this relatively infrequent event significantly simplifies LSU 406.

The FOQ is logically two separate queues unified in a single structure: one queue for accesses to the Dcache, and one queue for accesses to the Ecache. Each entry in the FOQ can be marked as accessing the Dcache and/or accessing the Ecache. FIFO ordering within each class is preserved. That is, all Dcache requests are kept in order with respect to each other, and all Ecache requests are kept in order with respect to each other. However, Dcache-only requests and Ecache-only requests may be dequeued in a different order than they were enqueued.

An FOQ entry that is marked to access both the Ecache and Dcache may logically be dequeued from the Ecache queue before being dequeued from the Dcache queue. After doing so, the request will still remain in the FOQ, but be marked only as a Dcache request. This might happen, for example, for a write request which is able to send its write through to the Ecache, but not yet able to write to the Dcache because a newly allocated Dcache line has not yet returned from memory. In general, the Ecache queue will "run ahead" of the Dcache queue, as the head of the Dcache queue will often be waiting for a response from the E chip, whereas requests to the E chip can generally be sent as soon as they are ready.

Sync instructions are always sent through the FOQ. A marker for an "Lsync S,V" is simply passed on to the E chip port after all Ecache requests in front of it have been sent. This marker informs the E chip port arbiter that previous scalar references from this port have been sent to E. A Gsync instruction marker is similarly passed through the FOQ and sent to the E chip port arbiter after all previous scalar references have been sent.

Processing an "Lsync V,S" instruction from the IRQ causes the head of the IRQ to block, preventing subsequent scalar references from accessing the Dcache or being sent to the Ecache until all vector references have been sent to the Ecache and all vector writes have caused any necessary invalidations of the Dcache. Vector write invalidations are performed using a separate port to the Dcache tags. Once all vector writes before the Sync have been run through the Dcache, LSU 406 is signalled to unblock the IRQ's at each cache controller 408. In the meantime, each cache controller 408 sends its "Lsync V,S" marker through its FOQ and on to the E chip port arbiter (in one implementation).

Markers for Msync instructions are also sent through the FOQ and passed to the port arbiter. Processing a regular Msync instruction from the IRQ causes cache controller 408 to go into "Dcache bypass" mode. In this mode, reads and writes are forced to miss in the Dcache and are sent to the Ecache following the Msync marker. This causes them to see the results of memory references made before the Msync by other P chips participating in the Msync. Once an E chip port arbiter has received the Msync marker from scalar LSU 406 and the vector LSU, it sends an Msync marker to the associated E chip. Once all participating P chips have sent their Msync markers to an E chip and E has sent the Dcaches any invalidations from writes before the Msync, the E chip sends Msync completion markers back to the P chips. An Msync completion marker from a given E chip turns off "Dcache bypass" mode at the associated cache controller 408. External invalidations received from the Ecache are performed using a separate port to the Dcache tags.

While in bypass mode, read requests that would otherwise hit in the Dcache actually cause the corresponding Dcache line to be invalidated. This is done so that a subsequent read that is processed just after Dcache bypass has been turned off will not read a line out of the Dcache, effectively reading earlier data than an earlier read request which is heading out to the Ecache via the FOQ. The "Dcache bypass" mode can also be permanently turned on via the DiagConfig control register.

FIGS. 4D and 4E illustrate a first and second portion of a table that provides processing details of an Initial Request Queue (IRQ) in the scalar load store unit, according to one embodiment of the present invention. Table 410 provides a complete listing of actions taken by a tag/state engine when processing IRQ requests. The first four columns indicate whether a cache controller 408 is currently in "Dcache bypass" mode, the request type, whether the request hits in the Dcache and whether the request matches the partial address in any FOQ entry. The remaining columns indicate the action that is taken to process the request.

In some cases, a message is sent directly to the E chips (via the port arbiter) by the IRQ tag/state engine. In two cases, the request is serviced directly from the Dcache and in all others it is placed into the FOQ. The "E", "D" and "P" columns of table 410 indicate whether an FOQ entry is marked as accessing the Ecache, accessing the Dcache, and/or pending, respectively. An entry marked pending will always be marked as a Dcache entry as well. It cannot be dequeued from the head of the Dcache queue until the matching response arrives from the Ecache, clearing its pending status.

The "Allocate" column indicates if a request causes a (least-recently-used) allocation in the Dcache, or causes an invalidation of the matching line. The "ORB Entry" indicates whether the request allocates an entry in the Outstanding Request Buffer (ORB). All requests that will receive a response from an E chip allocate an ORB entry. The ORB contains 16 entries, and is indexed by an transaction ID (TID) sent to the Ecache in the request packet and returned in the response. Each ORB entry contains a request type, load buffer index, an A or S register number, Dcache index and way, FOQ index, s/dword flag, and physical address bits 4 . . . 2 of the request. The ORB entry specifies what to do with the response when it is received from the E chip. A "Read" entry causes the response to be placed into the Dcache and the requested word to be sent to a register. A "ReadUC" entry causes the result to be sent only to a register, and not written into the Dcache. A "Prefetch" entry causes the result to be written to the Dcache, but not returned to a register. All scalar requests that allocate an ORB entry expect either a single s/dword or a full cache line in return. For full cache line requests, the requested word will be returned first, with the rest of the cache line following in increasing address, modulo the cache line size. For both word and cache line requests, the requested s/dword is returned directly to the register from the E port via the load buffers. Thus, the FOQ entry for a load that caused a Dcache allocation is marked as a dummy. It exists so that subsequent IRQ requests to the same line will detect a match and not access the pending line before it returns from the E chip. When a dummy request is dequeued from the FOQ, it is simply discarded; it does not access the Dcache.

Ecache requests at the head of the FOQ can be dequeued as follows. Regular writes, I/O writes, AMO reads (which return data) and writes (which do not) are dequeued after they are committed and after their data is available. I/O reads and Syncs are dequeued after they are committed. ReadUC and ReadNA requests can be dequeued immediately.

Dcache requests at the head of the FOQ can be dequeued as follows. Dummy requests can be dequeued after their matching response from E has returned and written the Dcache. Reads can be dequeued immediately. Allocating writes (those that were marked pending) can be dequeued after their matching response from E has returned and written the Dcache, they are committed, and their store data is available. Other writes are dequeued after they are committed, and their store data is available.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the described embodiments of the present invention.

What is claimed is:

1. A computerized method for accessing data in a memory system having a local cache and a higher level cache, comprising:
   obtaining a memory request;
   storing the memory request in an Initial Request Queue (IRQ); and
   processing the memory request from the IRQ by a cache controller, wherein processing includes:
   determining whether the memory request hits in the local cache;

determining whether a portion of an address associated with the memory request matches one or more partial addresses in a Force Order Queue (FOQ), wherein the FOQ stores a memory request that is pending to the higher level cache;

when the portion of an address associated with the memory request does not match the one or more partial addresses in the FOQ and, at the same time, the memory request hits in the local cache, servicing the memory request immediately using data in the local cache without adding the memory request to the FOQ;

when the portion of an address associated with the memory request does not match the one or more partial addresses in the FOQ and, at the same time, the memory request misses in the local cache, adding the memory request to the FOQ, allocating a cache line in the local cache corresponding to the local cache miss and servicing the memory request using data received from the higher level cache;

when the portion of an address associated with the memory request matches the one or more partial addresses in the FOQ and, at the same time, the memory request hits in the local cache, preventing the memory request from being satisfied in the local cache, wherein preventing includes adding the memory request to the FOQ and servicing the memory request using data received from the higher level cache; and when the portion of an address associated with the memory request matches the one or more partial addresses in the FOQ and, at the same time, the memory request misses in the local cache, preventing the memory request from being satisfied in the local cache, wherein preventing includes adding the memory request to the FOQ and servicing the memory request using data received from the higher level cache.

2. The computerized method of claim 1, wherein the obtaining of the memory request includes obtaining a memory load or a memory store request.

3. The computerized method of claim 1, wherein determining whether a portion of an address associated with the memory request matches one or more partial addresses in an Force Order Queue (FOQ) includes processing the memory request in the FOQ when local cache processing is bypassed.

4. The computerized method of claim 1, wherein determining whether a portion of an address associated with the memory request matches one or more partial addresses in an Force Order Queue (FOQ) includes processing the memory request in the FOQ when the memory request includes a synchronization request that causes local cache processing to be bypassed.

5. The computerized method of claim 1, wherein the FOQ is divided logically into a first and second queue, wherein the first queue monitors scalar memory requests to the higher level cache and the second queue monitors scalar memory requests that are serviced by the higher level cache but not yet written to the local cache.

6. A scalar processor, comprising:
a local cache;
an Initial Request Queue (IRQ); and
a cache controller having a Force Order Queue (FOQ), wherein the FOQ stores a scalar memory request that missed in the local cache and is pending to a higher level cache;
wherein the IRQ buffers a scalar load/store memory request having a scalar load/store instruction and its one or more associated addresses and sends the scalar load/store memory request to the cache controller and the local cache;
wherein, when a portion of the one or more associated addresses of the scalar load/store memory request does not match one or more partial addresses in the FOQ and, at the same time, the scalar load/store memory request hits in the local cache, the local cache services the scalar load/store memory request received from the IRQ without adding the memory request to the FOQ;
wherein, when the portion of the one or more associated addresses of the scalar load/store memory request does not match the one or more partial addressed in the FOQ and, at the same time, the scalar load/store memory request misses in the local cache, the scalar load/store memory request is added to the FOQ, one or more lines in the local cache are allocated for cache line replacement, and the scalar load/store memory request is passed to the higher level cache;
wherein, when the portion of the one or more associated addresses of the scalar load/store memory request matches the one or more partial addresses in the FOQ and, at the same time, the scalar load/store memory request hits in the local cache, the scalar load/store memory request is added to the FOQ and the scalar load/store memory request is passed to the higher level cache; and
wherein, when the portion of the one or more associated addresses of the scalar load/store memory request matches the one or more partial addresses in the FOQ and, at the same time, the scalar load/store memory request misses in the local cache, the scalar load/store memory request is added to the FOQ and the scalar load/store memory request is passed to the higher level cache.

7. The scalar processor of claim 6, wherein the scalar processor further includes a scalar load/store unit, wherein the scalar load/store unit includes an address generator to generate one or more physical addresses from the one or more associated addresses of the scalar load/store command.

8. The scalar processor of claim 7, wherein the address generator generates the one or more physical addresses using a translation look-aside buffer (TLB).

9. The scalar processor of claim 6, wherein the FOQ is divided logically into a first and second queue, wherein the first queue monitors scalar memory requests to the higher level cache and the second queue monitors scalar memory requests that are serviced by the higher level cache but not yet written to the local cache.

10. A scalar processor, comprising:
a local cache;
an Initial Request Queue (IRQ); and
a plurality of cache controllers, wherein each cache controller includes a Force Order Queue (FOQ), wherein the cache controllers receive scalar memory requests from the IRQ and wherein, when a cache controller receives such a scalar memory request, the cache controller stores the scalar memory request in its FOQ if the scalar memory request misses in the local cache and is pending to a higher level cache;
wherein the IRQ buffers a scalar load/store memory request having a scalar load/store instruction and its one or more associated addresses and sends the scalar load/store memory request to the local cache and to one of the plurality of cache controllers corresponding to the one or more associated addresses of the scalar load/store memory request;

wherein, when a portion of the one or more associated addresses of the scalar load/store memory request does not match one or more partial addresses in the FOQ and, at the same time, the scalar load/store memory request hits in the local cache, the local cache services the scalar load/store memory request received from the IRQ without adding the memory request to the FOQ;

wherein, when the portion of the one or more associated addresses of the scalar load/store memory request does not match the one or more partial addressed in the FOQ and, at the same time, the scalar load/store memory request misses in the local cache, the scalar load/store memory request is added to the FOQ, one or more lines in the local cache are allocated for cache line replacement, and the scalar load/store memory request is passed to the higher level cache;

wherein, when the portion of the one or more associated addresses of the scalar load/store memory request matches the one or more partial addresses in the FOQ and, at the same time, the scalar load/store memory request hits in the local cache, the scalar load/store command is added to the FOQ and the scalar load/store memory request is passed to the higher level cache; and wherein, when the portion of the one or more associated addresses of the scalar load/store memory request matches the one or more partial addresses in the FOQ and, at the same time, the scalar load/store memory request misses in the local cache, the scalar load/store memory request is added to the FOQ and the scalar load/store memory request is passed to the higher level cache.

11. The scalar processor of claim 10, wherein the FOQ includes a FOQ index array, wherein the FOQ index array contains a copy of indices and control information for the FOQ entries.

12. The scalar processor of claim 10, wherein the FOQ is divided logically into a first and second queue, wherein the first queue monitors scalar memory requests to the higher level cache and the second queue monitors scalar memory requests that are serviced by the higher level cache but not yet written to the local cache.

\* \* \* \* \*

UNITED STATES PATENT AND TRADEMARK OFFICE
CERTIFICATE OF CORRECTION

PATENT NO.        : 7,519,771 B1                                   Page 1 of 1
APPLICATION NO.   : 10/643577
DATED             : April 14, 2009
INVENTOR(S)       : Faanes et al.

It is certified that error appears in the above-identified patent and that said Letters Patent is hereby corrected as shown below:

On Page 2, under "Other Publications", in column 2, line 4, delete ""Comptuer" and insert -- "Computer --, therefor.

On Page 3, under "Other Publications", in column 1, line 2, delete "Processings" and insert -- Proceedings --, therefor.

On Page 3, under "Other Publications", in column 2, line 22, delete "Communicaton" and insert -- Communication --, therefor.

On Page 4, under "Other Publications", in column 2, line 51, delete "Channnels"," and insert -- Channels", --, therefor.

On Page 5, under "Other Publications", in column 2, line 9, delete "Compiliers" and insert -- Compilers --, therefor.

Signed and Sealed this

Sixteenth Day of June, 2009

*JOHN DOLL*
*Acting Director of the United States Patent and Trademark Office*